(12) United States Patent
Shrivastava et al.

(10) Patent No.: US 8,351,384 B2
(45) Date of Patent: Jan. 8, 2013

(54) ALLOCATING GROUP RESOURCES FOR WIRELESS COMMUNICATIONS

(75) Inventors: Shweta Shrivastava, Beaverton, OR (US); Rath Vannithamby, Portland, OR (US); Yuval Lomnitz, Herzelia (IL); Aran Bergman, Givatayim (IL); Tom Harel, Shfaim (IL)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 12/644,090

(22) Filed: Dec. 22, 2009

(65) Prior Publication Data
US 2011/0044266 A1     Feb. 24, 2011

Related U.S. Application Data

(60) Provisional application No. 61/275,266, filed on Aug. 24, 2009.

(51) Int. Cl.
*H04W 4/00*     (2009.01)
*H04L 1/00*     (2006.01)
*H04L 12/26*     (2006.01)

(52) U.S. Cl. .................................... 370/329; 370/235

(58) Field of Classification Search .................. 370/229, 370/235, 328, 329
See application file for complete search history.

(56) References Cited

U.S. PATENT DOCUMENTS

| | | | |
|---|---|---|---|
| 2002/0080816 A1* | 6/2002 | Spinar et al. | 370/449 |
| 2008/0062936 A1 | 3/2008 | He | |
| 2008/0117853 A1* | 5/2008 | Kim et al. | 370/312 |
| 2008/0182616 A1* | 7/2008 | Connors et al. | 455/552.1 |
| 2009/0040970 A1 | 2/2009 | Ahmadi | |
| 2009/0323541 A1* | 12/2009 | Sagfors et al. | 370/252 |

OTHER PUBLICATIONS

Korean Patent Office, International Search Report and Written Opinion issued in corresponding PCT Application No. PCT/US2010/046480, dated Apr. 26, 2011, 10 pages.
Detailed ARQ Proposal for 802.16a and 802.16b MAC, IEEE 802.16.3c-01/68, Vladimir Yanover et al., May 16, 2001, 18 pages.

* cited by examiner

*Primary Examiner* — Ronald Abelson
(74) *Attorney, Agent, or Firm* — Trop, Pruner & Hu, P.C.

(57) ABSTRACT

A single format of MAC control message may be used for the addition, deletion, or rearrangement of users in a group within a wireless network. In some cases, a change in the nature of the group may be implemented immediately upon receipt of a positive acknowledgement. A mobile station may determine its ACID without maintaining information about the previous ACID or startup frame.

23 Claims, 4 Drawing Sheets

ALLOCATING GROUP RESOURCES FOR WIRELESS COMMUNICATIONS

CROSS-REFERENCE TO RELATED APPLICATIONS

This application claims priority to provisional patent application 61/275,266, filed Aug. 24, 2009, hereby expressly incorporated by reference herein.

BACKGROUND

This relates generally to wireless communications.

Group resource allocation is a wireless communication technique to allocate resources to multiple users as a group in order to save control overhead and increase network capacity. It may be utilized, for example, in a WiMAX network. (IEEE Std. 802.16-2005, IEEE Standard for Local and Metropolitan Area Networks, Part 16: Interface for Fixed Broadband Wireless Access Systems, 802.16-2009 (802.16e) and 802.16m, IEEE New York, N.Y. 10016).

Generally, signaling information for allocations using group resource allocation is transmitted by way of a so-called MAP information element (IE) transmitted from a base station to a mobile station. The first MAP IE used by group resource allocation mechanism is called the group configuration MAP IE, which is used to add a mobile station to a group. Deletion and rearrangement of mobile stations within a group is performed in the group resource allocation IE that also signals the allocation information for the mobile stations within a group.

Since the MAP IEs also contain allocation information, the MAP IEs need to be parsed with minimum delay. The time critical processing of MAP IEs is called "online processing". However, the mobile station addition, deletion, and rearrangement processes are "background processing" which are not time-critical and can be performed on a slower scale. The inclusion of background processing in MAP IEs slows down the parsing of MAP IEs causing undesirable delay for online processing. This makes the mobile station more expensive in terms of cost and power consumption, in some cases.

DETAILED DESCRIPTION

Figure 1:
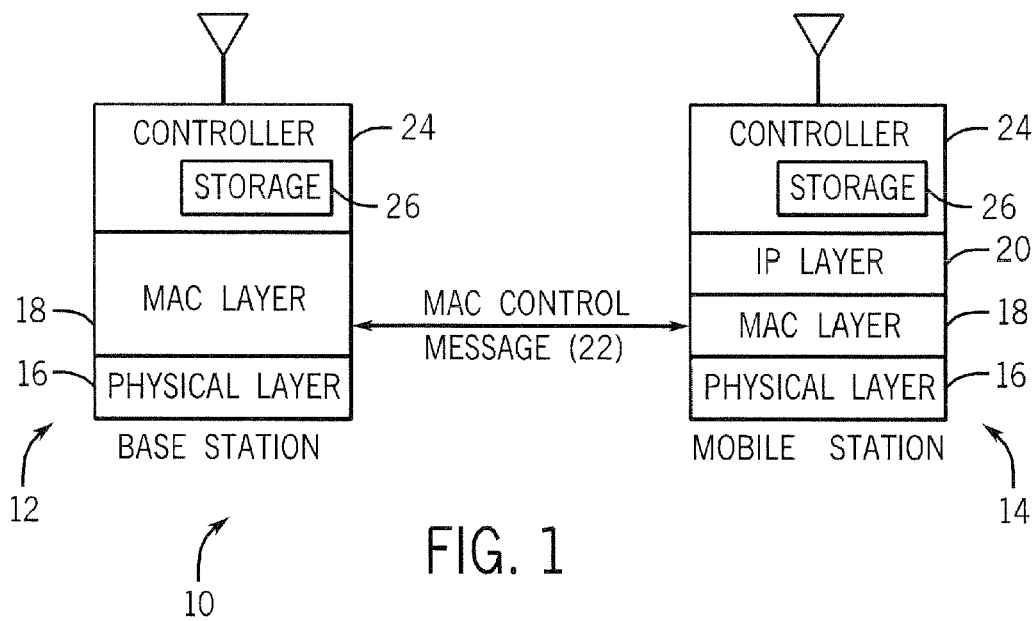
FIG. 1 is an architecture depiction of one embodiment.

Referring to FIG. 1, a base station 12 may communicate with a mobile station 14 in a wireless network such as a WiMAX network. In one embodiment, each of the base station and mobile station includes a physical layer 16, a medium access control or MAC layer 18 and a controller or processor 24, associated with a storage 26. In some embodiments, the storage 26 may store instructions that may be executed by the controller. In such case, the storage 26 constitutes one embodiment of a computer readable medium that stores instructions for execution by the controller 24. In other embodiments, the storage 26 may be separate from the controller 24 that executes the instructions. In fact, the storage 26 may be any semiconductor, optical, or magnetic memory. The mobile station 14 may also include an Internet Protocol (IP) layer 20.

In some embodiments, the base station and the mobile station may communicate using MAC control messages 22. These messages are also sometimes called MAC management messages. They may be advantageous, in some embodiments, because they allow direct communication between the base station and the mobile station without going through the Internet Protocol layer 20, which may involve additional overhead.

In some embodiments, a MAC control message may eliminate the need for special error control for MAP IEs because the MAC control messages use the standard hybrid automatic repeat request (HARQ) process for error control. They may also allow the mobile stations sufficient time to process addition and deletion information that is not time critical. Removal of addition and deletion information from the MAP IEs enables the mobile station to perform quick parsing of these IEs, in some embodiments, to retrieve resource allocation information. Finally, combining the processes of addition, deletion, and rearrangement in one message type makes the mobile station implementation simpler.

In accordance with one embodiment, the following group configuration for a MAC management message may be used:

| Field Name | Size (bits) | Comments |
|---|---|---|
| MAC management message type | x | |
| GRA message type | 2 | 00 = initial configuration<br>01 = re-configuration<br>10 = deletion |
| If (msg type==0) { | | |
|   Group ID | 5 | ID of the group to which MS is added |
|   GRA Periodicity | 2 | Periodicity of group allocation |
|   Group MIMO mode set | 2 | Signals MIMO modes supported in group |
|   User bitmap index | 5 | Index or position of user in group's user bitmap |
|   Initial_ACID | 4 | |
|   N_ACID | 3 | |
|   N_Burst_Sizes | 2 | Number of burst sizes supported in group |
|   For (i=0; i<N_Burst_Sizes; i++) { | | |
|     Burst size i | n | |
|   } | | |
| } | | |
| else if (msg type==01) { | | |
|   New user bitmap index | 5 | New index of user in user bitmap after re- |

| Field Name | Size (bits) | Comments |
|---|---|---|
| | | arrangement |
| } | | |
| Padding | variable | |

Figure 2:
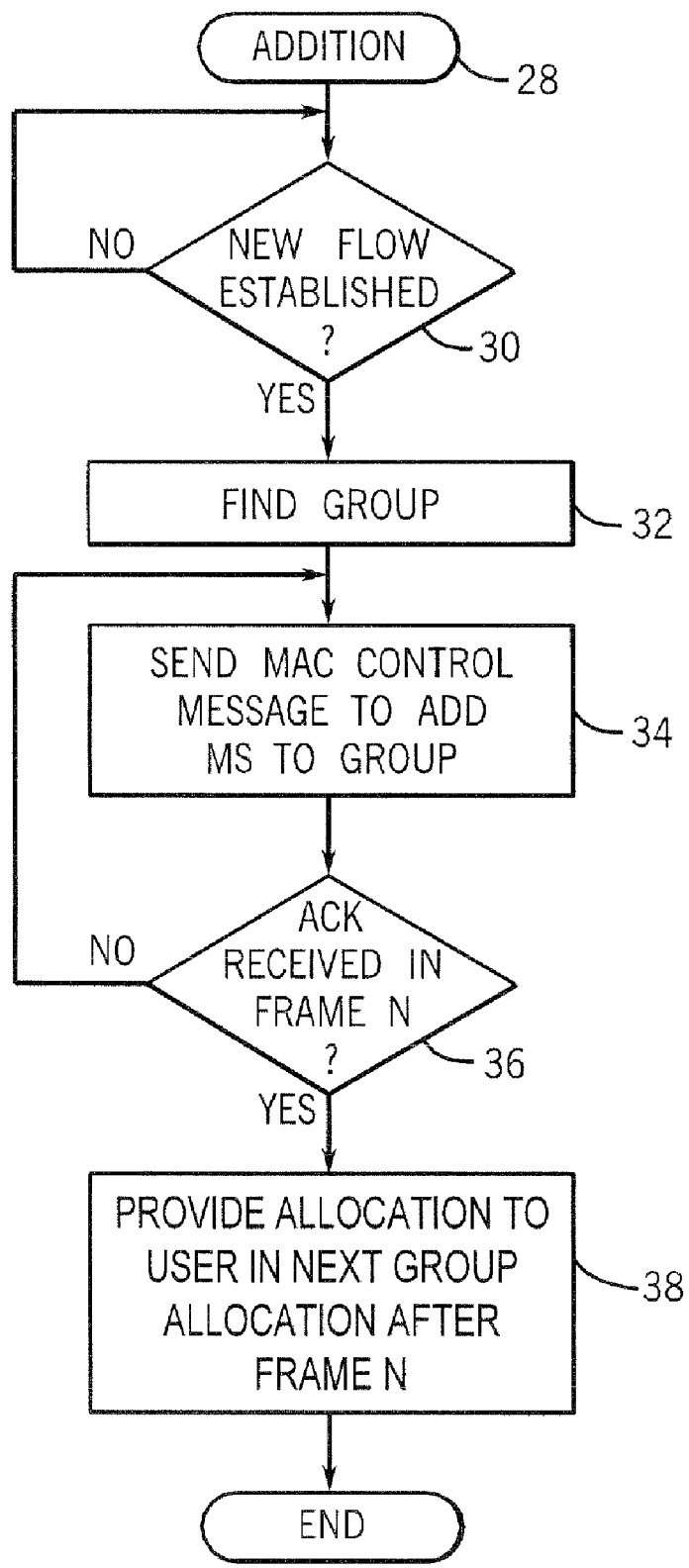
FIG. 2 is a flow chart for the addition of a user to a group for one embodiment.

In accordance with one embodiment of the present invention, a group resource allocation may be preceded by a sequence of adding users or mobile stations to the group, deleting users or mobile stations from the group, and rearranging mobile stations or users within a group. FIG. 2 is a flow chart for an embodiment that implements the addition of users to a group.

In one embodiment, the sequence 28 may be implemented in software or hardware. In a software embodiment, it may be implemented by instructions stored in a computer readable medium, such as the storage 26 in the base station 12. The instructions may be executed by the controller 24.

Initially, a check at diamond 30 determines whether a new user flow has been established. If so, an appropriate group is identified, as indicated in block 32. Then a MAC control message may be sent from the base station to the mobile station to add the mobile station to the group, as indicated in block 34.

A check at diamond 36 determines whether a positive acknowledgement is received, in the base station, from the mobile station, in a frame N. If so, the allocation is provided to the user in the next group resource allocation after frame N, as indicated in block 38. Otherwise, if a positive acknowledgement is not received, as determined in diamond 36, the flow iterates back to block 34 and the MAC control message is resent using the HARQ retransmission process defined in the WiMAX/802.16m standard in one embodiment.

With respect to the embodiment shown in FIG. 2, providing the allocation to the user in the next group allocation after frame N, as indicated in block 38, removes the overhead from the mobile station of having to keep track of information in order to determine the correct frame number where allocation for the mobile station starts in some embodiments. A MAC control message is sent for the addition of a user to a group. Depending on the number of HARQ retransmissions required for the message and the HARQ transmission delay, successful transmission of the message may take multiple frames. Even after a message is successfully retrieved, the mobile station may require some kind of processing information and updated state. This may cause ambiguity as to when the user is considered to be added to the group and when its allocation should start. Thus, in some embodiments, the use of the offset can serve as a fixed offset or minimal offset between a frame in which the positive acknowledgement has been received from the mobile station and the frame in which the allocation for the mobile station actually starts.

Figure 3:
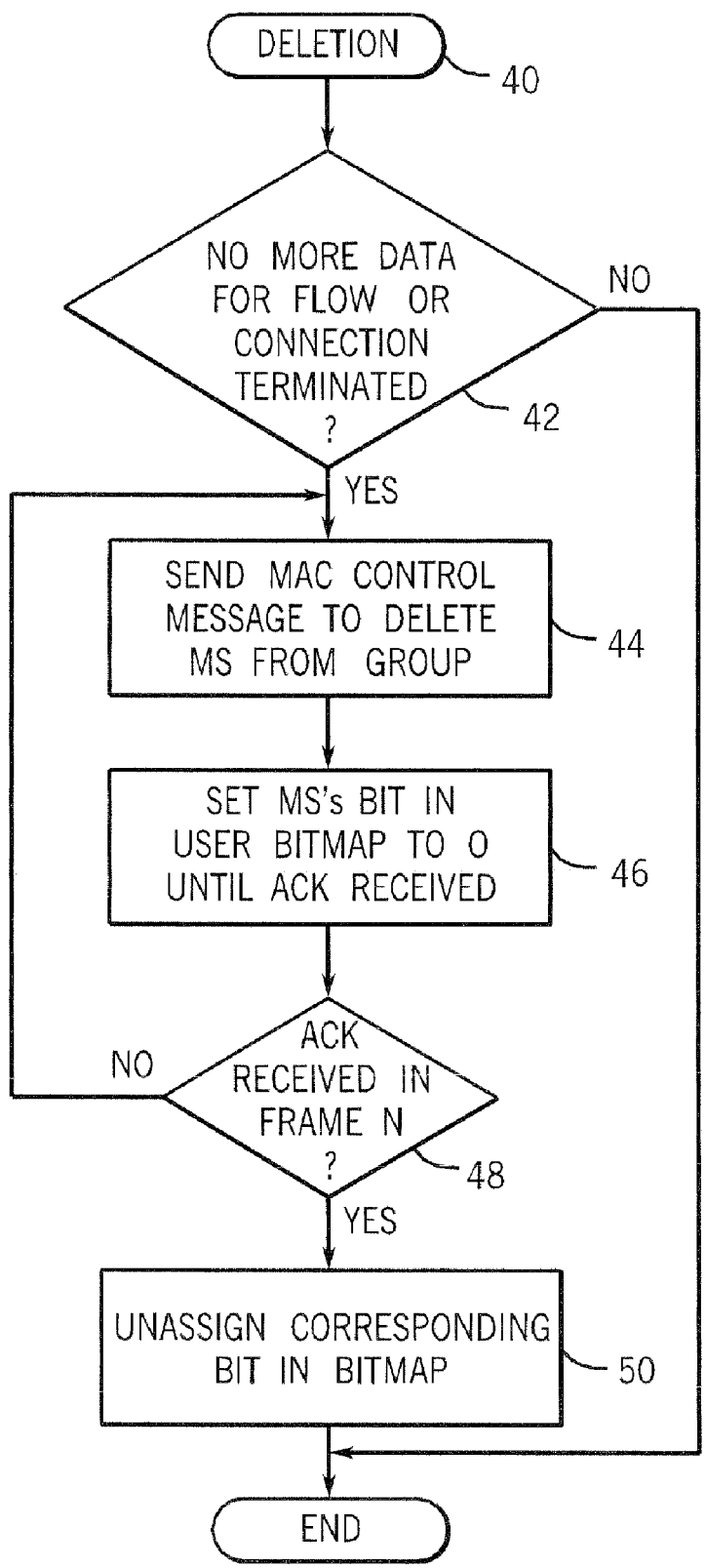
FIG. 3 is a flow chart for the deletion of a user from a group in accordance with one embodiment.

Referring to FIG. 3, a sequence for deletion of a mobile station or user from a group is illustrated. Again, the sequence 40 may be implemented in software, hardware, or firmware. If the sequence 40 is implemented in software, instructions to implement the sequence may be stored in a computer readable medium, such as the storage 26, in the base station 12. The instructions may, for example, be executed by the controller 24.

A check at diamond 42 determines whether there is more data for a flow or whether a connection was terminated. If so, a MAC control message is sent from the base station to the mobile station to delete the mobile station from the group, as indicated in block 44. Then, the mobile station's bit in a user bitmap is set equal to zero until a positive acknowledgement is received, as indicated in block 46.

A check at diamond 48 determines whether a positive acknowledgement was received in frame N. If so, the corresponding bit in the bitmap is unassigned, as indicated in block 50. If the positive acknowledgement is not received, as determined in diamond 48, the flow iterates to resend the MAC control message in block 44.

If more data for the flow is available or the connection was not implemented, then the deletion sequence 40 is not executed at that time. The sequence may also be executed when a group change is required for the mobile station.

Figure 4:
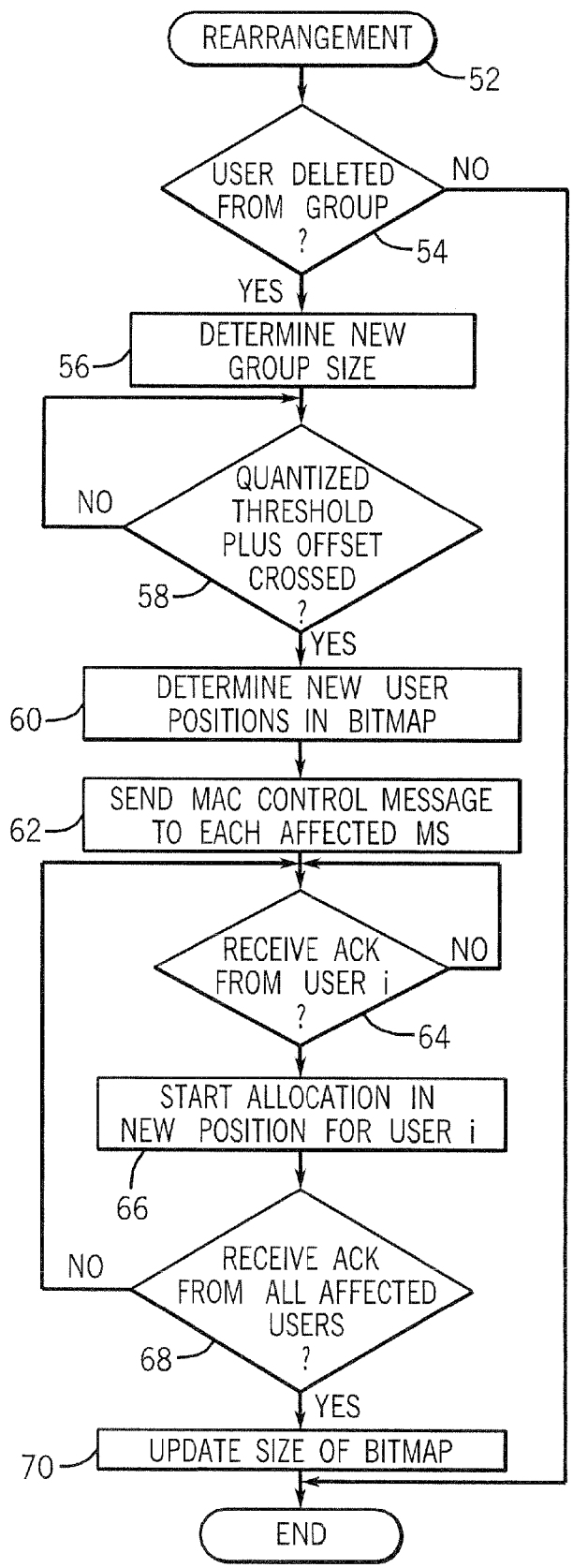
FIG. 4 is a flow chart for the rearrangement of users within a group in accordance with one embodiment.

Moving to FIG. 4, a sequence 52 for the rearrangement of users in a group resource allocation may be implemented in firmware, software, or hardware. It allows for periodic rearrangement of the users in response to additions and deletions of users from a group resource allocation. If the sequence 52 is implemented in software, instructions to implement the sequence may be stored in a computer readable medium, such as the storage 26, in the base station 12. The instructions may, for example, be executed by the controller 24.

A check at diamond 54 determines whether a user has been deleted from the group. If so, a new group size is determined in block 56.

A user bitmap within the group resource allocation information element uses one bit per user to signal which user of the group has an allocation in a corresponding sub-frame. Using "quantized" bitmaps means that the user bitmap size can only belong to a quantized set of sizes. In the case of a quantized sized bitmap, the set of sizes can be predefined in a standard or in a signal from the base station to the mobile station. In that case, the size of the bitmap can be chosen only from these quantized sizes. Normally, if certain users are deleted from the group, other users do not need to rearrange to fill up the empty positions in the user bitmap.

However, rearrangement can be performed based on certain algorithms. In order to avoid a ping pang effect between two consecutive sizes, the rearrangement can be done when the number of users has crossed a threshold plus an offset. Another way to deal with the effect is to wait until the threshold for the number of users is crossed and the number of users remains below or above the threshold for a given number of frames.

When the number of users in the group crosses a quantized threshold plus an offset, in one embodiment, rearrangement may be implemented, as indicated in diamond 58. This may reduce the frequency of rearrangement and, hence, the probability of an error in changing user positions in some embodiments.

Next, in block 60, the new user positions are determined in the bitmap. Then a MAC control message may be sent to each affected mobile station in block 62.

When a positive acknowledgement is received from a given user i, as determined in diamond 64, the allocation is begun in the new user position for user i immediately (block 66). Then a check at diamond 68 determines whether the positive acknowledgement has been received from all affected users. If so, the size of the bitmap is updated, as indicated in block 70.

If the positive acknowledgement has not been received from all of the users, the flow goes back to wait for receipt of the positive acknowledgement from all users in diamond 64.

If, in diamond 58, the quantized threshold plus an offset is not crossed, then the flow simply iterates.

In some embodiments, immediately allocating the new position for the user i, as indicated in block 66, avoids the delay in starting the allocation. The MAC control message signaling the addition of the mobile station or the group may be piggybacked with the allocations. Since a separate MAP IE is not required for piggybacking message, this can save control overhead, in some embodiments. When the addition of the mobile station of the group is complete, the base station can start allocating the mobile station via the group resource allocation. In some embodiments, starting a mobile station's allocation using non-group allocation avoids delay in transmitting packets. Piggybacking of MAC control messages with the data allocation saves overhead, ascending map IE signaling allocation for these MAC control messages.

In some embodiments, the set of burst sizes that are supported for group resource allocation may involved only a subset of these supported group's burst sizes being available for users allocated to the group. A subset of burst sizes can be different for different groups and needs to be signaled to each user belonging to the group.

In one embodiment, the burst sizes belonging to a group may be determined as follows. The total number of burst sizes supportable using group resource allocation can be limited. For example, a set of $N_1$ burst sizes out of the possible burst sizes are supported in the physical layer. Each of these burst sizes may be assigned a unique code. This set of $N_1$ burst sizes in the encoding can be predefined in the standard or can be configurable by the base station. out of these $N_1$ burst sizes, given groups supports only $N_2$ burst sizes, which $N_2$ is less than $N_1$.

The value of $N_2$ can either be predefined in a standard or may be configurable by the base station. The $N_2$ burst sizes need to be known by the mobile station in order to decode its allocation. These $N_2$ burst sizes can be signaled by the base station to the mobile station in a group configuration MAC control message. The encoding of these burst sizes is determined by the mobile station based on the order in which they are sent in the MAC control message. Thus, if $N_2$ is 8, then 3 bit codes can be used to represent each of the values. The 3 bit codes may be 000, 001, 010, 011, 100, 101, 110, and 111, and may be assigned to 8 burst sizes signaled in the MAC control message in the same order in which they appear in the message.

For transmissions corresponding to a given flow, multiple HARQ channels, called ACIDs, may be used to simultaneously transmit multiple packets for a flow without waiting for all HARQ retransmissions for a first packet to complete. The ACID is one of a plurality of simultaneous HARQ logical channels used in WiMAX. There are 16 channels, from 0 to 15, per mobile station. Thus, the ACID number is from 0 to 15.

Thus, a base station can use another channel while waiting for a positive acknowledgement from a first packet sent over a first channel. For normal communications, the base station can use any of the 16 channels for one mobile station. The mobile station knows what channel is being used. But, with respect to group resource allocation, the channel is not signaled. Thus, an implicit mechanism is used to determine the ACID number in the mobile station.

The base station and the mobile station are in sync on the ACID corresponding to an allocation to keep track of the corresponding retransmissions. In order to minimize control overhead for the group resource allocation, the base station does not explicitly signal the ACID number for a user's allocation in the group resource IE. Instead, each flow that is part of the group is assigned a set of N_ACID ACIDs and the ACID for each user's allocation is assumed to implicitly cycle from the initial_ACID value. That is, the first allocation for a user starts with initial_ACID and the next allocation increments by one and so on, until the maximum value is reached, after which the ACID cycles back to initial_ACID.

Figure 5:
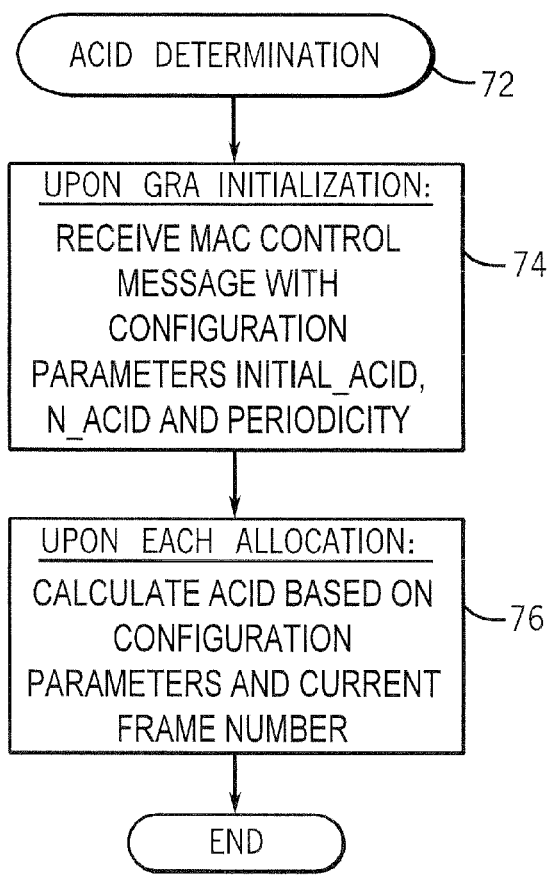
FIG. 5 is a flow chart for ACID determination in a mobile station in accordance with one embodiment.

To reduce the complexity in determining the ACID, as well as to remove the ambiguity in determining the ACID when a MAP IE is lost, the sequence shown in FIG. 5 may be utilized for ACID determination. The sequence 72 may be implemented in software, hardware, or firmware. If the sequence 72 is implemented in software, instructions to implement the sequence may be stored in a computer readable medium, such as the storage 26, in the mobile station 14. The instructions may, for example, be executed by the controller 24.

In block 74, upon a group resource allocation initialization, the mobile station receives the MAC control message with the configuration parameters initial_ACID, N_ACID and periodicity of the group resource allocation. For each allocation, the mobile station calculates the ACID, as indicated in block 76 based on the configuration parameters and the current frame number.

Thus, if the ACID is incremented every P frames, P is the periodicity of group allocation, irrespective of whether the user had an allocation in the corresponding frame or not, the problem of synchronizing after a MAP IE loss, may be eliminated, in some embodiments. This is because the ACID can be determined from the initial_ACID, and the frame number in which the initial_ACID was used.

The ACID may be determined as the initial_ACID plus the floor of the modulo (Mod) of the quanity current_frame_number plus station identifier. The floor is basically the lowest integer value of the remainder after a division. And the modulo basically gives you the remainder. The modulo is determined with respect to the maximum possible frame number. The current frame number is simply the current frame number and the station_ID is information the base station already has. The station_ID is either the full station identifier of the mobile station or its last N digits. The modulo of that quantity is then determined with respect to the number of ACIDs or N_ACID.

More particularly, the formula used, in one embodiment, is as follows:

$$\text{Current\_ACID} = \text{Mod}(\text{Initial\_ACID} + \text{Mod}(\text{floor}(\text{Mod}(\text{Frame\_Number} + \text{STID}, \text{Max\_Frame\_Number}) / \text{Allocation\_Period}), N\_\text{ACIDs}), 16)$$

where the Frame_Number parameter in the above formula identifies the frame of current allocation and is calculated as follows:

$$\text{Frame\_Number} = \text{Superframe\_Number} * 4 + \text{Frame\_Offset}$$

where Frame_Offset is the offset of the current frame with respect to the start of the corresponding superframe. The value of Frame_Offset varies from 0 to 3.

Thus, to take a simple example, the floor of the modulo, with respect to the maximum frame number of the current frame number plus the station identifier divided by the periodicity, and then the modulo is taken with respect to the number of acids may be determined as follows.

The problem is that sometimes the frame numbers can cycle back to zero, so with the formula taken as the modulo of the maximum number of frames, this issue can be avoided. Thus, the mobile station can determine its ACID without having to store much of any information that it would not have stored anyway.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   enabling a base station to provide a group resource allocation in the next group allocation after a frame in which a positive acknowledgement was received from a mobile station for a group allocation;
   enabling the base station to use said MAC control message for rearrangement; and
   using a quantized threshold to determine when to provide for rearrangement.

2. The method of claim 1 including:
   enabling the base station to use a single MAC control message sent directly to the mobile station without going through an Internet Protocol layer format for addition, deletion, and rearrangement of mobile stations in a group for group resource allocation in a wireless network.

3. The method of claim 2 including enabling a base station to send a MAC control message adding a mobile station to a group.

4. The method of claim 1 including providing a quantized threshold plus an offset for determining when to rearrange mobile stations in a group.

5. The method of claim 4 including determining when a quantized threshold plus offset has been crossed and rearranging the users in a bitmap in response thereto.

6. The method of claim 5 including determining whether a positive acknowledgement has been received from a mobile station in response to the MAC control message and, if so, start the new allocation in new positions after the acknowledgement has been received.

7. The method of claim 2 including determining when an acknowledgement has been received from all mobile stations affected by rearrangement and, in response thereto, updating the size of the bitmap.

8. The method of claim 2 including using the MAC control message format for the deletion of a mobile station from a group.

9. The method of claim 8 including, in response to the determination that there is no more data for a flow or a connection has been terminated, sending a MAC control message to delete a mobile station from a group.

10. The method of claim 9 including setting a mobile station's bit in a user bitmap to zero pending receipt of a positive acknowledgement to said MAC control message.

11. The method of claim 10 including unassigning a corresponding bit in a bitmap in response to the positive acknowledgement.

12. A computer readable medium storing instructions executed by a processor on a base station to:
   use a single MAC control message format for addition, deletion, and rearrangement of mobile stations in a group for group resource allocation in a wireless network;
   use the MAC control message for rearrangement; and
   use a quantized threshold to determine when to provide for rearrangement.

13. The medium of claim 12 further storing instructions to send a MAC control message adding a mobile station to a group.

14. The medium of claim 13 further storing instructions to provide an allocation in a next group allocation after the frame in which a positive acknowledgement was received from the mobile station to the MAC control message.

15. The medium of claim 12 further storing instructions to provide a quantized threshold plus an offset to determine when to rearrange mobile stations in a group.

16. The medium of claim 12 further storing instructions to determine when an acknowledgement has been received from all mobile stations affected by rearrangement and, in response thereto, update the size of the bitmap.

17. The medium of claim 12 further storing instructions to use the MAC control message format for the deletion of a mobile station from a group.

18. A method comprising:
   enabling a mobile station to receive, upon group resource allocation initialization, a MAC control message with configuration parameters; and
   enabling the mobile station, upon each allocation, to calculate an ACID based on the configuration parameters and a current frame number.

19. The method of claim 18 including enabling the mobile station to determine the ACID based on the initial_ACID and the frame number in which the initial_ACID was used.

20. The method of claim 19 including enabling the mobile station to determine the ACID using the floor of the modulo of the current frame number and a station identifier.

21. The method of claim 19 including enabling a determination of the frame number based on a superframe number and a frame offset of the current frame with respect to the start of the corresponding superframe.

22. The method of claim 18 including enabling the mobile station to determine the ACID even after a MAP information element was lost.

23. The method comprising:
   enabling a base station to use a single MAC control message format for addition, deletion, and rearrangement of mobile stations in a group for group resource allocation in a wireless network;
   enabling a base station to provide a group resource allocation in the next group allocation after a frame in which a positive acknowledgement was received from a mobile station for a group allocation; and
   determining when an acknowledgement has been received from all mobile stations affected by rearrangement and, in response thereto, updating the size of the bitmap.

* * * * *